United States Patent
Baumgarten et al.

(10) Patent No.: US 6,406,575 B1
(45) Date of Patent: Jun. 18, 2002

(54) PROCESS FOR PRODUCING A PNEUMATIC TIRE

(75) Inventors: Rainer Baumgarten, Wietzendorf; Olaf Campsheide, Nienburg; Volkmar Fries, Garbsen; Roland Jenke, Hademstrof, all of (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/502,768

(22) Filed: Feb. 11, 2000

(30) Foreign Application Priority Data

Feb. 11, 1999 (DE) .......................... 199 05 643

(51) Int. Cl.$^7$ ................ B29D 30/06; B29D 30/52
(52) U.S. Cl. ............. 156/96; 156/111; 156/128.1; 156/130; 156/130.5; 156/133; 264/502
(58) Field of Search ............... 156/111, 96, 123, 156/126–130, 130.7, 130.5; 152/454, 209.6; 264/501, 502; 425/17

(56) References Cited

U.S. PATENT DOCUMENTS

| | | | | |
|---|---|---|---|---|
| 3,960,628 A | * | 6/1976 | Snyder .................. | 156/123 |
| 4,050,497 A | * | 9/1977 | Pakur et al. ........... | 156/123 |
| 4,976,300 A | * | 12/1990 | Takehara et al. ...... | 152/454 |
| 5,415,826 A | * | 5/1995 | Lange et al. .......... | 264/501 |
| 5,536,348 A | * | 7/1996 | Chlebina et al. ...... | 156/129 |

FOREIGN PATENT DOCUMENTS

| | | | | |
|---|---|---|---|---|
| DE | 1480936 | | 3/1969 | |
| DE | 2032636 | | 1/1971 | |
| DE | 1729633 | | 6/1971 | |
| DE | 19549501 | | 9/1996 | |
| EP | 729825 A2 | * | 9/1996 | |
| GB | 1202702 | | 8/1970 | |
| GB | 1317901 | | 5/1973 | |
| JP | 58-39438 A | * | 3/1983 | ........... 264/501 |

* cited by examiner

Primary Examiner—Geoffrey L. Knable
(74) Attorney, Agent, or Firm—Greenblum & Bernstein, P.L.C.

(57) ABSTRACT

Process for producing a pneumatic tire that includes an inner liner of a layer that is as air-impermeable as possible, at least one carcass ply provided with strength supports, horn profiles, bead cores, sidewalls, a belt assembly, and a tread. The process includes building-up a partial tire in a production part A, where the partial tire includes at least a carcass body that includes the at least one carcass ply provided with the strength supports, bead reinforcements and cores, core fillers and horn profiles, and an undertread, and shaping and at least partially vulcanizing the partial tire under an internal pressure in a vulcanization mold in a first vulcanization procedure. The process also includes determining a cross-sectional contour for a completed tire and an amount of surface and strength supports to be added to the partial tire prior to a production part B, and building-up the partial tire in the production part B by adding remaining tire components to produce a complete tire. Further, the process includes vulcanizing the complete tire in the vulcanization mold, thereby bonding the partial tire to the remaining tire components. While vulcanizing the complete tire, a residual elevation produced by internal pressure is applied, whereby the complete tire is molded to its final contour. The residual elevation in shoulder areas of the completed tire is greater than or equal to the residual elevation in a zenith area.

33 Claims, 2 Drawing Sheets

PROCESS FOR PRODUCING A PNEUMATIC TIRE

CROSS-REFERENCE TO RELATED APPLICATIONS

The present application claims priority under 35 U.S.C. §119 of German Patent Application No. 199 05 643.9, filed on Feb. 11, 1999, the disclosure of which is expressly incorporated by reference herein in its entirety.

BACKGROUND OF THE INVENTION

1. Field of the Invention

The present invention relates to a process for producing a pneumatic tire, e.g., for motor vehicles, that includes a build-up of the tire with an inner liner of a layer that is as air-impermeable as possible, at least one carcass ply provided with strength supports, horn profiles, bead cores, sidewalls, a belt assembly, an optional one-part or multi-part belt bandage, and a tread. The production process is divided into two separate production parts A and B. In production part A, a partial tire is built up and includes at least the carcass body provided with reinforcing plies, bead reinforcements and cores, core fillers and horn profiles, optionally, parts of the belt plies and/or the belt bandage, and the undertread. The partial tire is shaped and then at least partially vulcanized under internal pressure in a vulcanization mold in a first vulcanization procedure, in which a predetermined cross-section contour is imparted to both the surface and the strength support(s). In production part B, the partial tire is built up by adding the remaining tire components, essentially the belt assembly, optionally, the at least single-ply one or more-piece belt bandage, the tread, and the remaining sidewall parts, thereby producing a complete tire. The complete tire undergoes a second vulcanization procedure in a vulcanization mold to bond the partial tire to the remaining tire components, during which, a residual elevation produced by internal pressure is applied, and the complete tire is molded to its final contour.

2. Discussion of Background Information

In a production process for new tires different from the conventional process, the known build-up of the tire carcass is carried out on a first building-up drum and the further build-up to produce the finished green tire is carried out on a second building-up drum that includes a shaping part and on which the carcass is joined with the belt tread packet. It is customary to use a one-step process in which the carcass production and the preparation of the green tire takes place on a single building-up machine with several building-up drums.

The prepared green tire is fully vulcanized in an appropriate vulcanization mold and, thus, receives its final form with a molded-in tread profile.

In this situation, there is always the problem that, during the shaping of the cylindrical preform to produce the torus-shaped tire body and during the vulcanization, in which internal pressure is applied to the preform via a bellows and in which the preform is placed under elevated temperature to receive its "residual elevation," it must be considered that the geometry of the carcass can change as a result of each expansion procedure and also that the volumes of the superimposed rubber layers, e.g., the volumes of the tread or of the rubber parts of the sidewall, can be displaced. Adjustment for this change in geometry, which is ascertained empirically, must be undertaken in advance to compensate for it. However, such compensation or adjustment holds the dangers that, e.g., in the areas particularly subjected to the expansion, exact dosing of the rubber volumes and exact shaping are difficult.

Thus, generic processes and devices have continually been suggested in which first an at least partly vulcanized green carcass is produced and the outer plies of the tire are subsequently applied onto the green carcass or carcass body whose contour already corresponds essentially to the finished tire. DE-PS 14 80 936 shows a tire in which a vulcanized running ring with a belt-type reinforcement is bonded with an unvulcanized or merely prevulcanized tire body or a tire carcass, after which the total tire is fully vulcanized. However, the disadvantage of this process is that a further layer, which ensures the adhesion of the individual parts to one another, must be inserted as a rule to bond the carcass and the tread.

As in previous processes that suggest a separate production and vulcanization of a carcass body and its subsequent bonding with the remaining tire components in a separate manufacturing procedure, the problem arises that, due to the second shaping required to combine it with the remaining tire components, increased stresses and compressive strains are introduced into the reinforcing plies and, in particular, also into belt plies already present, i.e., by the residual elevation of the already vulcanized and shape-stable carcass. These stresses and strains can have a strong influence on the durability of the tire. An inserted adhesive or bonding layer to reduce the second shaping of the already vulcanized and shape-stable carcass does not fundamentally solve this problem, since this has a disadvantageous effect on the vulcanization process.

In addition, a conflict in aims arises in such a two-part production process. In particular, the individual radially adjustable circumferential segments of a vulcanizing mold customarily designed as a segment mold should, if possible, have only a small displacement or adjustment path in the radial direction for closing the mold. Otherwise, the rubber material is strongly squeezed at the closing segment edges and a flow component occurs that is directed into the closing gap and radially outwardly, which strongly influences tire uniformity and, therefore, requires subsequent work. However, to apply, e.g., the necessary vulcanization pressure among other things, such a small displacement or adjustment path in the radial direction requires a large residual elevation, which, as discussed above, produces the undesirably increased stresses and strains in the carcass components, i.e., in the reinforcing plies and, in particular, also in belt plies already present.

The results of defective tire uniformity are evident in an unsatisfactory running behavior, in increased development of noise, and in a strong load on the bonding areas during operation.

The process disclosed in DE-OS 20 32 636, in which a treadless tire casing, i.e., a carcass body first produced as a partial tire, then provided with a lining and subsequently partly vulcanized, shows precisely the same disadvantages. In this partial vulcanization, the inside of the tire casing is fully vulcanized, while the radially outer surface of the treadless tire casing is not vulcanized. Across its cross-section, therefore, a half-fully vulcanized treadless tire body with a lining is available for further manufacture.

The lining is intended essentially to protect the partial tire, i.e., the part of the tire casing which is not fully vulcanized, from detrimental influences during an intermediate storage period. At a later point in the manufacture, the lining is removed and a tread is applied onto the treadless tire, whereafter the finished tire can then be fully vulcanized under pressure and heat.

DE-PS 17 29 633 describes a process for producing a pneumatic tire in which a carcass is prevulcanized only so that the reinforcing or fabric plies already present are fixed to such an extent that a serious displacement of them during the subsequent full molding of the profile is no longer to be feared. While it is true that the frequently described problem is solved, i.e., that a displacement of the reinforcing plies can also take place during the impressing of the tread profile as a result of the displacements of the volumes in the not yet vulcanized rubber, which has a detrimental effect on the later strength of the tire, the introduction of stresses and strains into the carcass components is not prevented here either, and also this conflict in aims is not resolved.

SUMMARY OF THE INVENTION

The present invention provides a process for producing a pneumatic tire in which an at least partially vulcanized carcass is first produced as a partial tire and the partial tire is built up to produce a complete tire in a separate manufacturing process by adding the remaining tire components. In the complete tire, a reliable bonding between the carcass and the remaining tire components is established, and the residual elevation of the already vulcanized and shape-stable carcass takes place without introducing stresses or strains into the carcass components. In this manner, tire non-uniformities are minimized by mold segments that close, and that can be incorporated into existing generic manufacturing processes in an economical manner without increasing the cost.

According to an exemplary embodiment of the instant invention, process for producing a pneumatic tire, e.g., for producing a pneumatic tire for motor vehicles, is disclosed. The process includes a progressive (or step-by-step) build-up of the tire with an inner liner of a layer that is as air-impermeable as possible, at least one carcass ply provided with strength supports (or reinforcement elements), horn profiles (or rim flange profiles), bead cores, sidewalls, and a belt assembly, an optional one-part or multi-part belt bandage, and a tread. The process can be divided into two separate production parts A and B. In production part A, a partial tire (or basic tire structure) is built up that contains at least the carcass body provided with reinforcing plies (strength supports), bead reinforcements and cores, core fillers and horn profiles, optional parts such as the belt plies and/or the belt bandage, and the undertread. The partial tire is then shaped and subsequently at least partially vulcanized under internal pressure in a vulcanization mold in a first vulcanization procedure. Before production part B, a cross-section contour, which is determined in advance, is imparted to both the surface and the strength support(s). In production part B, the partial tire is built up by adding the remaining tire components, i.e., essentially the belt assembly, an optional at least single-ply one or more-piece belt bandage, the tread, and remaining sidewall parts to, thereby, produce a complete tire. The complete tire is subsequently vulcanized in a second vulcanization procedure in the vulcanization mold to bond the partial tire to the remaining tire components. In the vulcanization procedure, a residual elevation is produced by an applied internal pressure, which molds the complete tire to its final contour. The residual elevation of the shoulder areas of the completed tire, applied by the internal pressure in the vulcanization mold during the second vulcanization procedure, is greater than or equal to the residual elevation in the zenith area.

Thus, the process is designed, e.g., so that the residual elevation of the shoulder areas of the completed tire, which is applied by internal pressure in a vulcanization mold during the second vulcanization procedure in process part B, is greater than or equal to the residual elevation in the zenith area.

According to the invention, a specifically divided residual elevation relative to both the shoulder and zenith areas, has a particularly advantageous effect in the sense of reducing the cord forces in the belt that are applied by the residual elevation. This is likewise true for the tensile or pressure load on the belt edge, in spite of the greater influence here of the elevation in the area of the tire shoulder.

A reduction in the introduced stresses and strains then leads to a tire durability that is excellent for the generic tire production process. Such a process likewise enables an adjustment travel or the impression depth of the mold segments to be reduced, e.g., at the critical points in the shoulder area, which has a positive influence on running behavior, development of noise, and loading of bonding areas during operation.

An alternative, or additional, advantageous development of the process includes that a cross-section contour of the partial tire produced in process part A can be determined in advance in that, for a stipulated final contour of the complete tire produced in process part B, the cross-section contour of the partial tire built up in process part A has a greater width than the final contour of the complete tire fully molded in process part B.

The stresses or strains acting on the reinforcing plies inside the carcass, as well as the loads in the core area, are clearly reduced due to a premanufactured "long side" of this type, by which an additional carcass length is made available. Moreover, by the interaction between the belt and the carcass, smaller extensions of the tire cross-section also have an increasingly favorable effect on the loading of the belt cords and the belt edges.

In such an advance determination of the cross-section contour of the partial tire produced in process part A, the influence of the thickness of the components to be applied in process part B must, of course, also be taken into consideration.

In a further alternative and advantageous development of the process, the final contour of the complete tire produced in process part B can be determined in advance in that, when the cross-section contour of the partial tire built up in process part A is stipulated, the final contour of the complete tire produced in process part B has a flatter sidewall contour than the cross-section contour of the partial tire fully molded in process part A.

This makes it possible, without previous large adjustments of the partial tire built up in process part A, to take all the process measures necessary for reducing stresses and strains in the area of the vulcanization or the design or adjustment of the heated mold, because the consistently formed unit carcass can be produced in great numbers as a partial tire. However, from an economic point of view, this must be correlated with the mold or vulcanization processes that are made more expensive by such a measure, which also include appropriate device adjustments.

Thus, a flatter sidewall contour of the complete tire produced in process part B can be achieved due to the vulcanization mold having a narrower heating mouth, i.e., with a shorter distance between the contact or supporting surfaces for the bead areas, which leads to a flatter sidewall contour when the material mass used for the processing is constant.

As in the direct development and influencing of the residual elevation according to the primary claim, as will become clear when the other process developments are explained, an indirect influencing of the residual elevation also becomes possible in the process variants aimed at determining in advance the molds of the tires (tire parts) produced in process parts A or B.

A further advantage of these processes includes that the loss of contact pressure that occurs as a result of the deformation of the reinforcing plies due to the residual elevation is reduced. Thus, a more uniform and adequately strong pressure is achieved between the carcass components and other tire parts. Further, a reliable adjustment of vulcanization pressure and temperature can be achieved, which leads to a quite perfect bonding of the tire components to one another. Moreover, with such a process, the formation of porosities in the tread rubber, which may arise if the contact pressure during vulcanization is too low, can be avoided.

Because the degree of residual elevation is inversely proportional to the degree of circumferential stiffness of the belt assembly, a definitely uniform contact pressure is achieved across the entire width of the tire.

It may be advantageous for the residual elevation in the zenith area to be, e.g., between approximately 1–6 mm, and preferably between approximately 2–4 mm, relative to the diameter, and for the residual elevation of the shoulder areas to be, e.g., between approximately 2–6 mm, and preferably between approximately 3–4 mm, relative to the diameter.

With a development of the residual elevation of these dimensions, a reduction in strains and stresses can be achieved for a great number of tire sizes and types by slight pre-adjustments of the cross-section contour of the partial tire produced in process part A or slight changes in the vulcanization or in the vulcanization mold.

The uniform contact pressure and uniformly reduced load of the strength supports in the tire can be achieved in that the angle formed between the belt plies and running direction of the tire (belt angle) is, e.g., greater than approximately 20°. Preferably, an "obtuse" belt angle of about 25° is formed. The circumferential stiffness of the belt assembly decreases due to such an obtuse belt angle which, at a given deformation, leads to lower forces in the belt cords and to a uniform distribution of pressure inside the complete tire.

The present invention is directed to a process for producing a pneumatic tire that includes an inner liner of a layer that is as air-impermeable as possible, at least one carcass ply provided with strength supports, horn profiles, bead cores, sidewalls, a belt assembly, and a tread. The process includes building-up a partial tire in a production part A, where the partial tire includes at least a carcass body that includes the at least one carcass ply provided with the strength supports, bead reinforcements and cores, core fillers and horn profiles, and an undertread, and shaping and at least partially vulcanizing the partial tire under an internal pressure in a vulcanization mold in a first vulcanization procedure. The process also includes determining a cross-sectional contour for a completed tire and an amount of surface and strength supports to be added to the partial tire prior to a production part B, and building-up the partial tire in the production part B by adding remaining tire components to produce a complete tire. Further, the process includes vulcanizing the complete tire in the vulcanization mold, thereby bonding the partial tire to the remaining tire components. While vulcanizing the complete tire, a residual elevation produced by internal pressure is applied, whereby the complete tire is molded to its final contour. The residual elevation in shoulder areas of the completed tire is greater than or equal to the residual elevation in a zenith area.

According to a feature of the present invention, the build-up of the partial tire in production part A can include applying at least one of at least one belt ply and a belt bandage, and the remaining tire components added in production part B may include a belt assembly, the tread, and remaining sidewall. Further, the belt bandage can include one of a one-part and a multi-part belt bandage, and the remaining tire components added can further include at least one of a single-ply and a multi-ply belt bandage. The pneumatic tire may be adapted to be a motor vehicle tire.

In accordance with another feature of the invention, the residual elevation in the zenith area can be between approximately 1–6 mm relative to the diameter, and the residual elevation of the shoulder areas can be between approximately 2–6 mm relative to the diameter. Preferably, the residual elevation in the zenith area may be between approximately 2–4 mm relative to the diameter, and the residual elevation of the shoulder areas may be between approximately 3—4 mm relative to the diameter.

According to still another feature of the instant invention, belt plies can be applied to the tire at an angle to a tire running direction of greater than approximately 20°.

In accordance with a further feature of the present invention, production part B can be adapted for retreading used tires, and surface layers and tread may be removed from a prepared old carcass prior to production part B.

The present invention is directed to a process for producing a pneumatic tire that includes an inner liner of a layer that is as air-impermeable as possible, at least one carcass ply provided with strength supports, horn profiles, bead cores, sidewalls, a belt assembly, and a tread. The process includes building-up a partial tire in a production part A, where the partial tire includes at least a carcass body that includes the at least one carcass ply provided with the strength supports, bead reinforcements and cores, core fillers and horn profiles, and an undertread, and shaping and at least partially vulcanizing the partial tire under an internal pressure in a vulcanization mold in a first vulcanization procedure. The process also includes determining a cross-sectional contour for a completed tire and an amount of surface and strength supports to be added to the partial tire prior to a production part B, and building-up the partial tire in the production part B by adding remaining tire components to produce a complete tire. Further, the process includes vulcanizing the complete tire in the vulcanization mold, thereby bonding the partial tire to the remaining tire components. While vulcanizing the complete tire, a residual elevation produced by internal pressure is applied, whereby the complete tire is molded to its final contour. A cross-sectional contour of the partial tire produced in production part A can be determined in advance of production part B, and, for a predetermined final contour of the complete tire produced in production part B, the cross-sectional contour of the partial tire can be built up in production part A to have a greater width than the final contour of the complete tire molded in production part B.

The present invention is directed to a process for producing a pneumatic tire that includes an inner liner of a layer that is as air-impermeable as possible, at least one carcass ply provided with strength supports, horn profiles, bead cores, sidewalls, a belt assembly, and a tread. The process includes building-up a partial tire in a production part A, where the partial tire includes at least a carcass body that includes the at least one carcass ply provided with the strength supports, bead reinforcements and cores, core fillers and horn profiles, and an undertread, and shaping and at least partially vulcanizing the partial tire under an internal pressure in a vulcanization mold in a first vulcanization procedure. The process also includes determining a cross-sectional contour for a completed tire and an amount of surface and strength supports to be added to the partial tire prior to a production part B, and building-up the partial tire in the production part B by adding remaining tire components to produce a complete tire. Further, the process includes vulcanizing the complete tire in the vulcanization mold, thereby bonding the partial tire to the remaining tire components. While vulcanizing the complete tire, a residual elevation produced by internal pressure is applied, whereby the complete tire is molded to its final contour. The final contour of the complete tire produced in production part B may be determined in advance, and that, when a cross-sectional contour of the partial tire built up in production part A is known, the final contour of the complete tire produced in production part B may have a flatter sidewall contour than the cross-sectional contour of the partial tire fully molded in production part A.

The present invention is directed to a process of producing a pneumatic tire from a pre-produced partial tire. The process includes adding tire components to the partial tire to form a complete tire, placing the complete tire in a vulcanization mold, and vulcanizing the complete tire while a residual elevation is produced by an applied pressure in the vulcanization mold. A residual elevation in a shoulder region of the complete tire is greater than or equal to a residual elevation in a zenith region of the complete tire.

According to a feature of the invention, prior to vulcanizing, a gap can be formed between an outer surface of the complete tire in the shoulder and zenith region and a surface of the vulcanization mold. The gap may be formed to accommodate the residual elevations in the shoulder regions and the zenith region, and the gap in the shoulder regions may be between approximately 2–6 mm relative to the diameter, and the gap in the zenith region may be between approximately 1–6 mm relative to the diameter. Preferably, the gap in the shoulder region can be between approximately 3–4 mm relative to the diameter, and the gap in the zenith region can be between approximately 2–4 mm relative to the diameter.

According to another feature of the invention, the vulcanization mold can be a segmented mold.

In accordance with yet another feature of the invention, the process can further include determining a final contour from the contour of the partial tire, and adding enough tire components to achieve a desire final contour for the complete tire.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
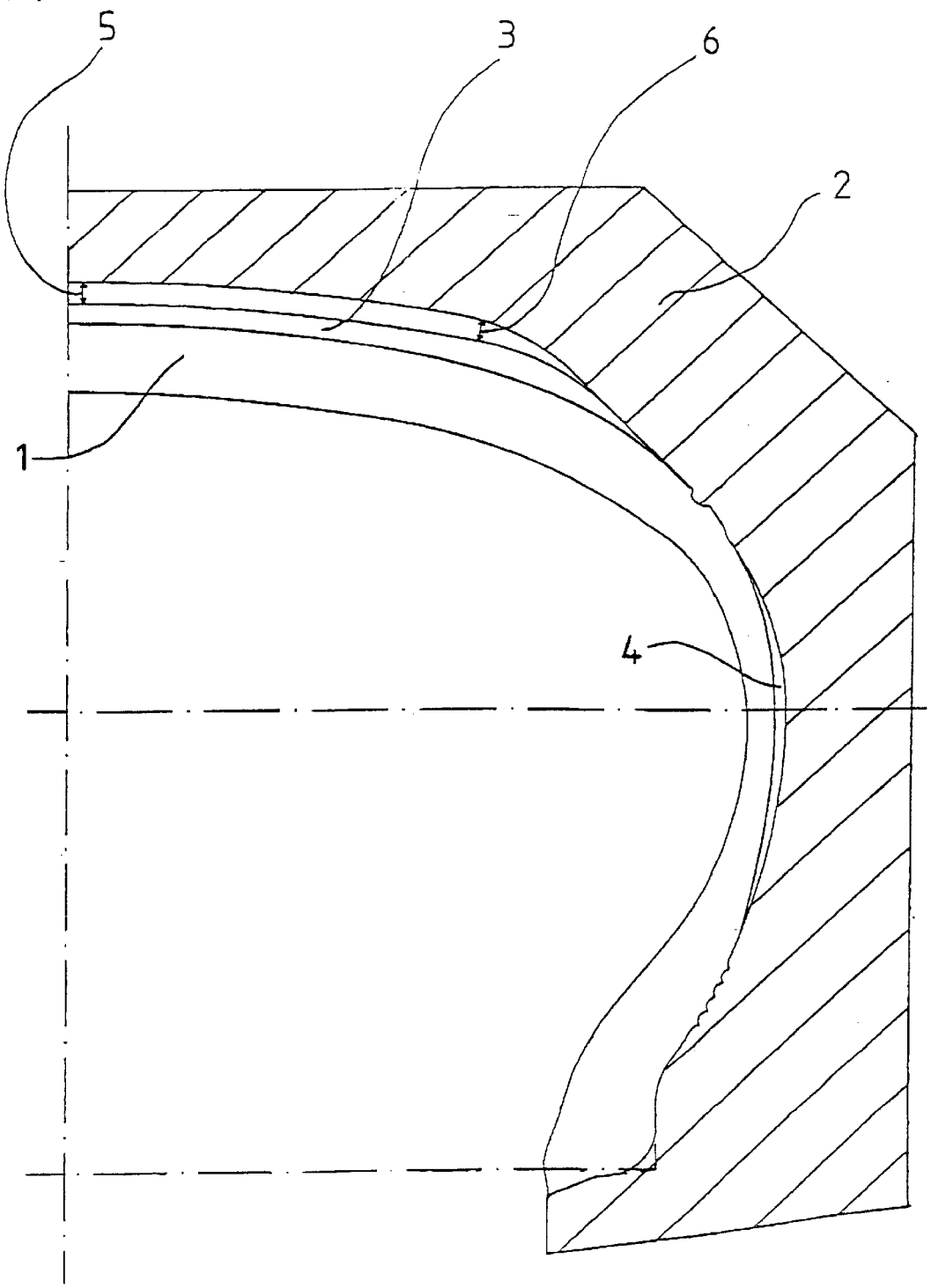
FIG. 1 illustrates a partial tire already built up in process part A and inserted into a vulcanization mold belonging to process part B, without internal pressure (vulcanization pressure)

FIG. 1 illustrates in partial cross-sectional view of a partial tire 1, which has already been produced and prevulcanized in a process part A. Partial tire 1 is inserted into a vulcanization mold 2 designed, e.g., as a segmented mold, in which, in process part B, the complete tire is built up after the remaining tire components have been added. The remaining tire components, e.g., tread 3 with its undertread and additional sidewall strips 4, are shown to already have been applied. A specified final contour of the complete tire to be produced in process part B can then fixed by an inside contour of vulcanization mold 2.

The cross-section contour of partial tire 1, which was already built up in process part A, had a width greater than that of the final contour of the complete tire, which is to be molded in process part B. Thus, after partial tire 1 has been inserted into vulcanization mold 2 and side parts have been attached to the smaller width portions of the final contour specified by vulcanization mold 2, free spaces or gaps 5 and 6 are formed in mold 2 for residual elevation in the zenith area and for residual elevations in the shoulder areas, respectively.

The gap available for residual elevation in the zenith is, e.g., approximately 1 mm and the free space available for residual elevation in the shoulder area is, e.g., approximately 3 mm.

Figure 2:
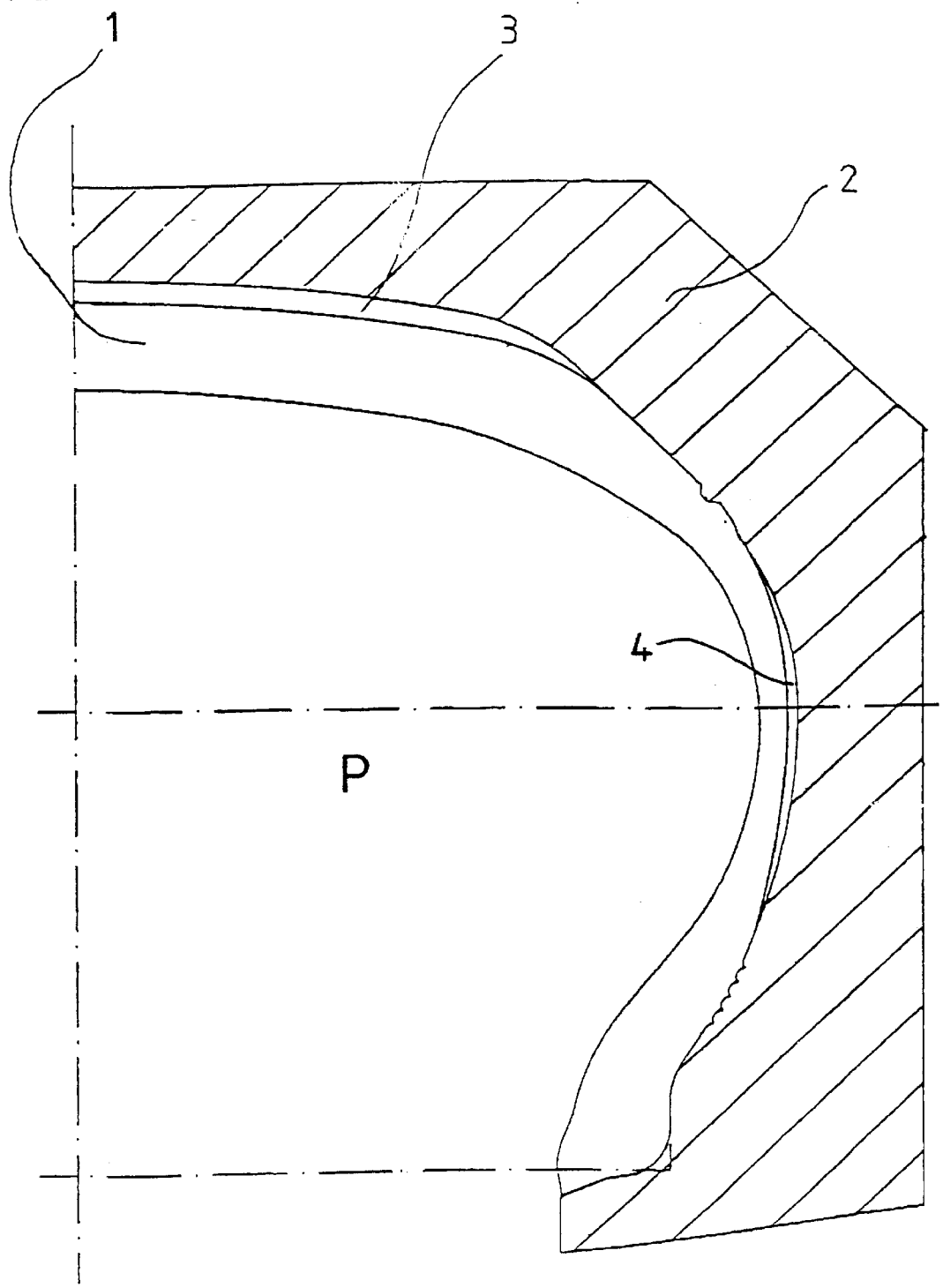
FIG. 2 illustrates a partial tire already built up in process part A and inserted into a vulcanization mold belonging to process part B, under vulcanization pressure.

FIG. 2 illustrates a state while process part B is being carried out, i.e., in which partial tire 1 and remaining tire components 3 and 4 contact the inside contour of vulcanization mold 2 under internal pressure load P and under residual elevation. Thus, partial tire 1 and components 3 and 4 are fully molded under vulcanization pressure and temperature and, thereby, are securely bonded together.

After the vulcanization procedure, the segmented mold is opened and the finished complete tire is removed from the vulcanization equipment.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE CHARACTERS

1 Partial tire
2 Vulcanization mold
3, 4 Remaining tire components
5 Gap for the residual elevation in the zenith
6 Gap for the residual elevation in the shoulder area
P Internal pressure load by means of vulcanization pressure

What is claimed:

1. A process for producing a pneumatic tire that includes an inner liner of a layer that is as air-impermeable as possible, at least one carcass ply provided with reinforcement elements, rim flange profiles, bead cores, sidewalls, a belt assembly, and a tread, the process comprising:

building-up a basic tire structure in a production part A, the basic tire structure comprising at least a carcass body that includes the at least one carcass ply provided with the reinforcement elements, bead reinforcements and cores, and core fillers and rim flange profiles;

shaping and at least partially vulcanizing the basic tire structure under an internal pressure in a vulcanization mold in a first vulcanization procedure to give a cross-sectional contour to a surface contour and a contour of the reinforcement elements in the production part A;

completing the at least partially vulcanized basic tire structure in a production part B to form a complete tire by adding remaining tire components; and vulcanizing the complete tire in the vulcanization mold, thereby bonding the basic tire structure to the remaining tire components, wherein, while vulcanizing the complete tire, the tire undergoes, under internal pressure, a residual elevation from its shape into contact with the mold to form a final contour, wherein the residual elevation in shoulder areas of the completed tire is greater than or equal to the residual elevation in a zenith area.

2. The process in accordance with claim 1, wherein the build-up of the basic tire structure in production part A includes applying at least one of at least one belt ply and a belt bandage, and wherein the remaining tire components added in production part B includes a belt assembly, the tread, and remaining sidewall.

3. The process in accordance with claim 2, wherein the belt bandage comprises one of a one-part and a multi-part belt bandage, and wherein remaining tire components added further includes at least one of a single-ply and a multi-ply belt bandage.

4. The process in accordance with claim 3, wherein the pneumatic tire is adapted to be a motor vehicle tire.

5. The process in accordance with claim 1, wherein the residual elevation in the zenith area is between approximately 1–6 mm, and the residual elevation of the shoulder areas is between approximately 2–6 mm.

6. The process in accordance with claim 5, wherein the residual elevation in the zenith area is between approximately 2–4 mm, and the residual elevation of the shoulder areas is between approximately 3–4 mm.

7. The process in accordance with claim 1, wherein the belt assembly includes reinforcement elements applied to the tire at an angle to a tire running direction of greater than approximately 20°.

8. The process in accordance with claim 1, wherein the basic tire structure built up in production part A further comprises an undertread.

9. A process for retreading used tires, the process comprising:

removing surface layers and the tread from a used tire;

adding remaining tire components to form a complete tire by adding remaining tire components; and vulcanizing the complete tire in a vulcanization mold, thereby bonding the used tire with the surface layers and tread removed to the remaining tire components, wherein, while vulcanizing the complete tire, a residual elevation produced by internal pressure is applied, whereby the complete tire is molded to its final contour, wherein the residual elevation in shoulder areas of the completed tire is greater than or equal to the residual elevation in a zenith area.

10. A process for producing a pneumatic tire that includes an inner liner of a layer that is as air-impermeable as possible, at least one carcass ply provided with reinforcement elements, rim flange profiles, bead cores, sidewalls, and a belt assembly, and a tread, the process comprising:

building-up a basic tire structure in a production part A, the basic tire structure comprising at least a carcass body that includes the at least one carcass ply provided with the reinforcement elements, bead reinforcements and cores, and core fillers and rim flange profiles;

shaping and at least partially vulcanizing the basic tire structure under an internal pressure in a vulcanization mold in a first vulcanization procedure to give a cross-sectional contour to a surface contour and a contour of the reinforcement elements in the production part A;

completing the at least partially vulcanized basic tire structure in a production part B to form a complete tire by adding remaining tire components; and vulcanizing the complete tire in the vulcanization mold, thereby bonding the basic tire structure to the remaining tire components, wherein, while vulcanizing the complete tire, the tire undergoes, under internal pressure, a residual elevation from its shape into contact with the mold to form a final contour, wherein a cross-sectional contour of the basic tire structure produced in production part A is determined in advance of production part B, and, for a predetermined final contour of the complete tire produced in production part B, the cross-sectional contour of the basic tire structure built up in production part A has a greater width than the final contour of the complete tire molded in production part B.

11. The process in accordance with claim 10, wherein the build-up of the basic tire structure in production part A includes applying at least one of at least one belt ply and a belt bandage, and wherein the remaining tire components added in production part B includes a belt assembly, the tread, and remaining sidewall.

12. The process in accordance with claim 11, wherein the belt bandage comprises one of a one-part and a multi-part belt bandage, and wherein remaining tire components added further includes at least one of a single-ply and a multi-ply belt bandage.

13. The process in accordance with claim 10, wherein the residual elevation in the zenith area is between approximately 1–6 mm, and the residual elevation of the shoulder areas is between approximately 2–6 mm.

14. The process in accordance with claim 13, wherein the residual elevation in the zenith area is between approximately 2–4 mm, and the residual elevation of the shoulder areas is between approximately 3–4 mm.

15. The process in accordance with claim 13, wherein the pneumatic tire is adapted to be a motor vehicle tire.

16. The process in accordance with claim 10, wherein the belt assembly includes reinforcement elements applied to the tire at an angle to a tire running direction of greater than approximately 20°.

17. The process in accordance with claim 10, wherein the basic tire structure built up in production part A further comprises an undertread.

18. A process for retreading used tires, the process comprising:
    removing surface layers and the tread from a used tire;
    adding remaining tire components to form a complete tire by adding remaining tire components; and
    vulcanizing the complete tire in a vulcanization mold, thereby bonding the used tire with the surface layers and tread removed to the remaining tire components, wherein, while vulcanizing the complete tire, a residual elevation produced by internal pressure is applied, whereby the complete tire is molded to its final contour,
    wherein a cross-sectional contour of the used tire with surface layers and tread removed is determined in advance of a production part B, and, for a predetermined final contour of the complete tire produced in production part B, the cross-sectional contour of the used tire with surface layers and tread removed has a greater width than the final contour of the complete tire molded in production part B.

19. A process for producing a pneumatic tire that includes an inner liner of a layer that is as air-impermeable as possible, at least one carcass ply provided with reinforcement elements, rim flange profiles, bead cores, sidewalls, and a belt assembly, and a tread, the process comprising:
    building-up a basic tire structure in a production part A, the basic tire structure comprising at least a carcass body that includes the at least one carcass ply provided with the reinforcement elements, bead reinforcements and cores, and core fillers and rim flange profiles;
    shaping and at least partially vulcanizing the basic tire structure under an internal pressure in a vulcanization mold in a first vulcanization procedure to give a cross-sectional contour to a surface contour and a contour of the reinforcement elements in the production part A;
    completing the at least partially vulcanized basic tire structure in a production part B to form a complete tire by adding remaining tire components; and
    vulcanizing the complete tire in the vulcanization mold, thereby bonding the basic tire structure to the remaining tire components, wherein, while vulcanizing the complete tire, the tire undergoes, under internal pressure, a residual elevation from its shape into contact with the mold to form a final contour,
    wherein the final contour of the complete tire produced in production part B is determined in advance, and that, a cross-sectional contour of the complete tire is predetermined so that the complete tire has a cross-sectional sidewall contour which is flatter than the cross-sectional sidewall contour of the at least partially vulcanized basic tire structure.

20. The process in accordance with claim 19, wherein the build-up of the basic tire structure in production part A includes applying at least one of at least one belt ply and a belt bandage, and
    wherein the remaining tire components added in production part B includes a belt assembly, the tread, and remaining sidewall.

21. The process in accordance with claim 20, wherein the belt bandage comprises one of a one-part and a multi-part belt bandage, and
    wherein remaining tire components added further includes at least one of a single-ply and a multi-ply belt bandage.

22. The process in accordance with claim 21, wherein the pneumatic tire is adapted to be a motor vehicle tire.

23. The process in accordance with claim 19, wherein the residual elevation in the zenith area is between approximately 1–6 mm, and the residual elevation of the shoulder areas is between approximately 2–6 mm.

24. The process in accordance with claim 23, wherein the residual elevation in the zenith area is between approximately 2–4 mm, and the residual elevation of the shoulder areas is between approximately 3–4 mm.

25. The process in accordance with claim 19, wherein the belt assembly includes reinforcement elements applied to the tire at an angle to a tire running direction of greater than approximately 20°.

26. The process in accordance with claim 19, wherein the basic tire structure built up in production part A further comprises an undertread.

27. A process for retreading used tires, the process comprising:
    removing surface layers and tread from a used tire;
    adding remaining tire components to the used tire with the surface layers and tread removed to form a complete tire; and
    vulcanizing the complete tire in a vulcanization mold, thereby bonding a basic tire structure to the remaining tire components, wherein, while vulcanizing the complete tire, the tire undergoes, under internal pressure, a residual elevation from its shape into contact with the mold to form a final contour,
    wherein the final contour of the complete tire produced in a production part B is determined in advance, and that, a cross-sectional contour of the complete tire is predetermined so that the complete tire has a cross-sectional sidewall contour which is flatter than the cross-sectional sidewall contour of the used tire with the surface layers and tread removed.

28. A process of producing a pneumatic tire from a pre-produced basic tire structure, which has been at least partially vulcanized, the process comprising:
    adding tire components to the at least partially vulcanized basic tire structure to form a complete tire;
    placing the complete tire in a vulcanization mold; and
    vulcanizing the complete tire while the tire, under internal pressure, undergoes a residual elevation from its shape into contact with the vulcanization mold, wherein a residual elevation in a shoulder region of the complete tire is greater than or equal to a residual elevation in a zenith region of the complete tire.

29. The process in accordance with claim 28, wherein, when the complete tire is placed in the vulcanization mold and prior to vulcanizing, a gap is formed between an outer surface of the complete tire in the shoulder and zenith region and a surface of the vulcanization mold.

30. The process in accordance with claim 29, wherein the gap is formed to accommodate the residual elevations in the shoulder regions and the zenith region, and
    wherein the gap in the shoulder regions is between approximately 2–6 mm, and the gap in the zenith region is between approximately 1–6 mm.

31. The process in accordance with claim 30, wherein the gap in the shoulder region is between approximately 3–4 mm, and the gap in the zenith region is between approximately 2–4 mm.

32. The process in accordance with claim 28, wherein the vulcanization mold is a segmented mold.

33. The process in accordance with claim 28, further comprising:

determining a final contour from the contour of the basic tire structure; and adding enough tire components to achieve a desire final contour for the complete tire.

\* \* \* \* \*